May 29, 1923.

P. DHÉ

MOLDING MACHINE

Filed Aug. 15, 1919

1,457,216

INVENTOR
Paul Dhé

BY

ATTORNEYS

Patented May 29, 1923.

1,457,216

UNITED STATES PATENT OFFICE.

PAUL DHÉ, OF PARIS, FRANCE.

MOLDING MACHINE.

Application filed August 15, 1919. Serial No. 317,791.

*To all whom it may concern:*

Be it known that I, PAUL DHÉ, a citizen of the Republic of France, residing at 49 ter Rue Notre Dame des Champs, Paris, France, have invented a new and useful Improved Molding Machine, of which the following is a specification.

This invention relates to a molding machine of improved construction for the purpose of giving to the peripheral part of the moulded articles an exactly determined height no matter how irregular may be the quantity of plastic material introduced into the mould by the operator.

To this end the top of the mould consists of a plunger in two parts fitting easily one around the other, the central part having a cross section smaller than that of the cavity of the mould, and the peripheral part being of suitable dimensions to allow it to rest upon the edge of the said mould.

Owing to this arrangement the central part of the plunger can be lowered more or less according to the quantity of plastic material placed in the mould and force out towards the periphery sufficient material to completely fill the space limited above by the peripheral portion of the plunger resting on the edge of the mould.

The accompanying drawing, by way of example represents a form of construction of a machine designed to mould small slabs or tiles from molten basalt, but it is to be understood that on the same principle, machines can be constructed for molding other plastic materials either hot or cold.

Figure 1:
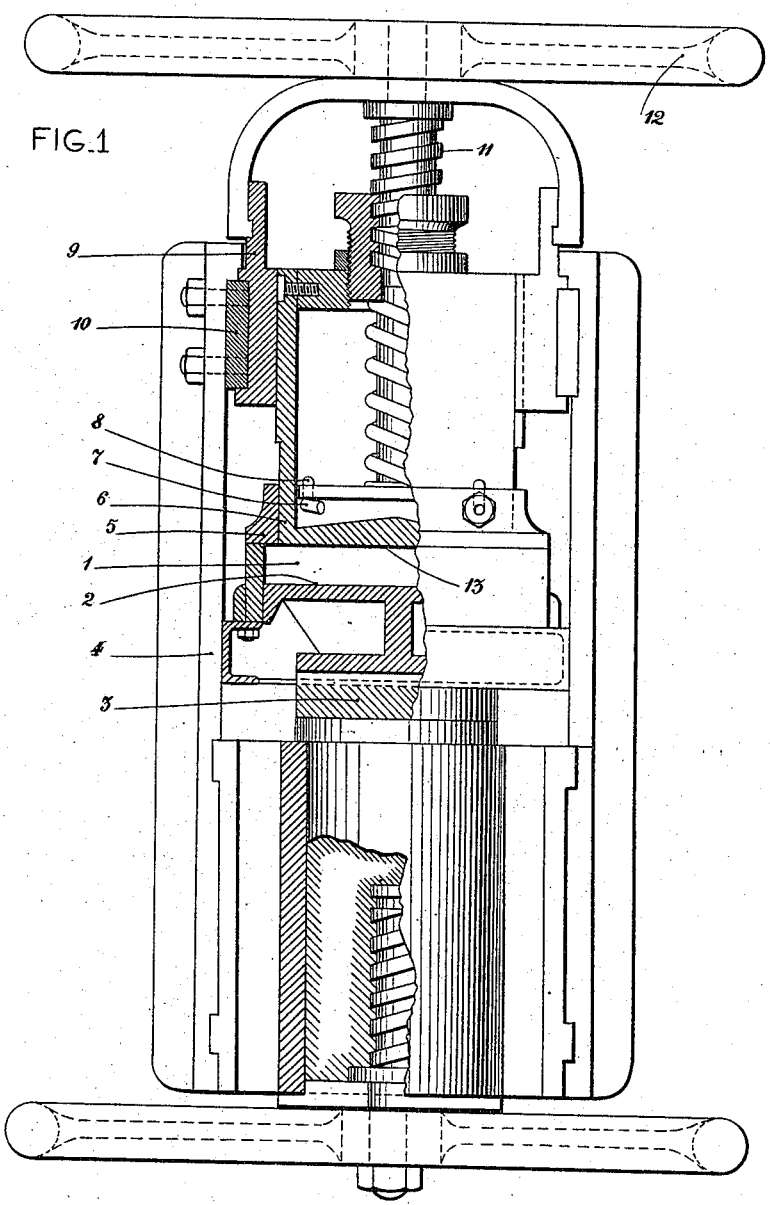
Figure 1 is an elevation of the molding machine partly in vertical section.

1 indicates the mould, the bottom 2 of which is fixed upon a withdrawing-plunger 3 whilst its side walls are fixed to the machine frame 4.

The compression plunger consists of two parts, namely an outer part 5 which can bear exactly upon the edges of the mould, and an inner part 6 which can slide easily in the interior of the part 5 and continue its movement when the said part 5 is stopped by the mould.

The parts 5 and 6 are united by lugs 7 adapted to slide in slots 8.

The compression plunger is guided in a sleeve 9 which can slide horizontally upon guides 10. When it is moved away from the mould, the molten material is poured into the latter. The compression plunger is brought back above the mould and then lowered by means of a screw 11 and a hand wheel 12 in order to exert the required pressure.

Figure 2:
Figure 2 is a transverse section of a moulded slab or tile.

The slab or tile produced (Figure 2) is of the required peripheral thickness throughout. Only the thickness of its central part varies from one operation to another and there is no inconvenience attaching to this, since the face 13 presenting a varying cavity is that which corresponds to the cement bath upon which the slab or tile will be placed.

It is to be understood that the lower face of the plunger 6 may be shaped so as to produce grooves, designs, stamping, etc., on the face 13 of the slab or tile.

The pressing operation being ended, the compression plunger is raised by means of the screw 11 and is caused to slide upon the guides 10, and then the product is removed from the mould by means of the withdrawing plunger 3.

In cases where materials are being operated upon at very high temperatures, the parts exposed to the heat can be cooled by a water circulation and the proper speed corresponding to a given product and a given temperature, can be regulated.

It is obvious that the invention is applicable to the manufacture of moulded articles of different shapes and dimensions and of various plastic or molten materials, such as metal, glass, etc., either hot or cold. The means for operating the plungers may be varied.

Claim:

In a molding press, the combination of a mould having stationary vertical walls, a coaxial compressing piston of smaller cross-section than that of the mould, a peripheral portion slidable on the said coaxial piston and adapted to bear upon the edge of the mould on the descent of the coaxial piston, a sleeve wherein the coaxial piston is vertically guided, and guideways having the said sleeve horizontally slidable therein in order that when the said sleeve and the said piston are separated from the mould the plastic material can be poured into the latter.

In testimony, that I claim the foregoing as my invention I have signed my name in presence of two subscribing witnesses.

PAUL DHÉ.

Witnesses:
CHAS. P. PRESSLY,
MAURICE RAUX.